Aug. 21, 1923.

E. P. STEVENS

KILN

Filed May 24, 1922

INVENTOR.
Enoch P. Stevens

BY
Wilkinson, Huxley, Byron + Knight
ATTORNEY.

Aug. 21, 1923.

E. P. STEVENS

KILN

Filed May 24, 1922

INVENTOR.
Enoch P. Stevens
BY
Wilkinson, Huxley, Byron + Knight
ATTORNEY.

Patented Aug. 21, 1923.

1,465,744

UNITED STATES PATENT OFFICE.

ENOCH P. STEVENS, OF CHICAGO, ILLINOIS.

KILN.

Application filed May 24, 1922. Serial No. 563,400.

*To all whom it may concern:*

Be it known that I, ENOCH P. STEVENS, a citizen of the United States, residing at Chicago, in the county of Cook and State of Illinois, have invented certain new and useful Improvements in Kilns, of which the following is a specification.

The present invention relates to kilns.

The present invention is illustrated in an embodiment of kiln of the center flue down draft type, though it will be understood as the description proceeds that the principles of the invention are equally applicable to other types of kiln.

An object of the present invention is to provide a kiln in which a uniform and evenly distributed heat may be maintained.

A further object is to provide a kiln in which air may be efficiently preheated before entering said kiln and in which the heated air is efficiently distributed throughout the kiln.

Further objects will appear as the description proceeds.

Referring to the drawings—

Figure 2:
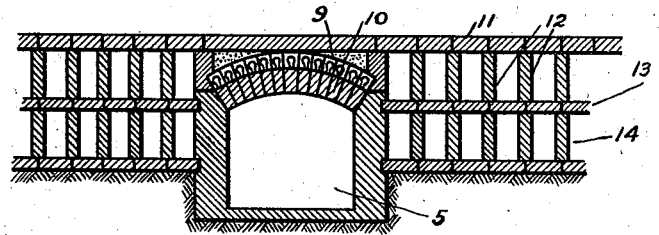
Figure 2 is a sectional view taken along the plane marked by the line 2—2 of Figure 1.
Figure 3:
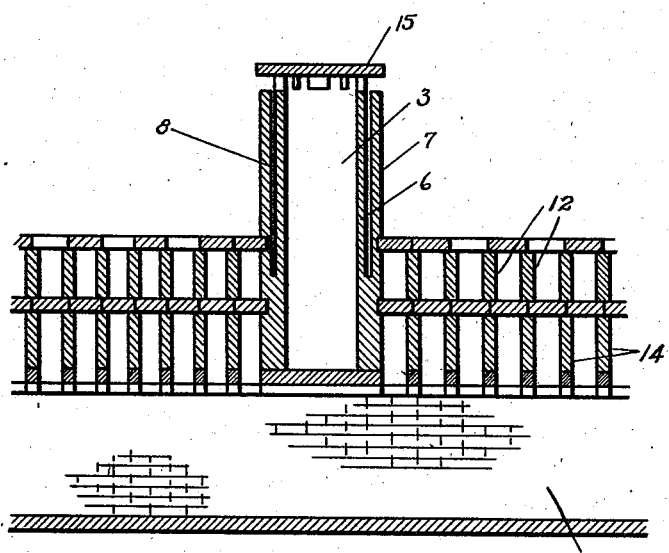
Figure 3 is a sectional view taken along the plane marked by the line 3—3 of Figure 1.

The numeral 1 indicates the wall of a kiln which is shown as being circular in cross section and which has the dome 2. Axially placed with reference to the wall 1 is the center flue 3 which conducts products of combustion to the interior of the kiln from the fire box 4, said products of combustion passing through the radially placed passageway 5 in reaching the flue 3. The flue 3 is formed by the upstanding cylindrical wall 6, which wall 6 is surrounded by the wall 7, coaxially mounted with said wall 6. Said walls 6 and 7 are spaced apart to form an air chamber 8, which communicates with the air holes 9—9 leading from the atmosphere. The upper wall of the chamber 5 is indicated by the numeral 10, which wall, as shown in Figure 2, is formed to provide the holes 9 which lead to the chamber 8.

The floor of the kiln is indicated by the numeral 11, which floor is mounted upon a series of parallel walls 12, which in turn are mounted upon the baffle wall 13, said baffle wall being mounted upon a series of parallel walls 14.

Figure 4:
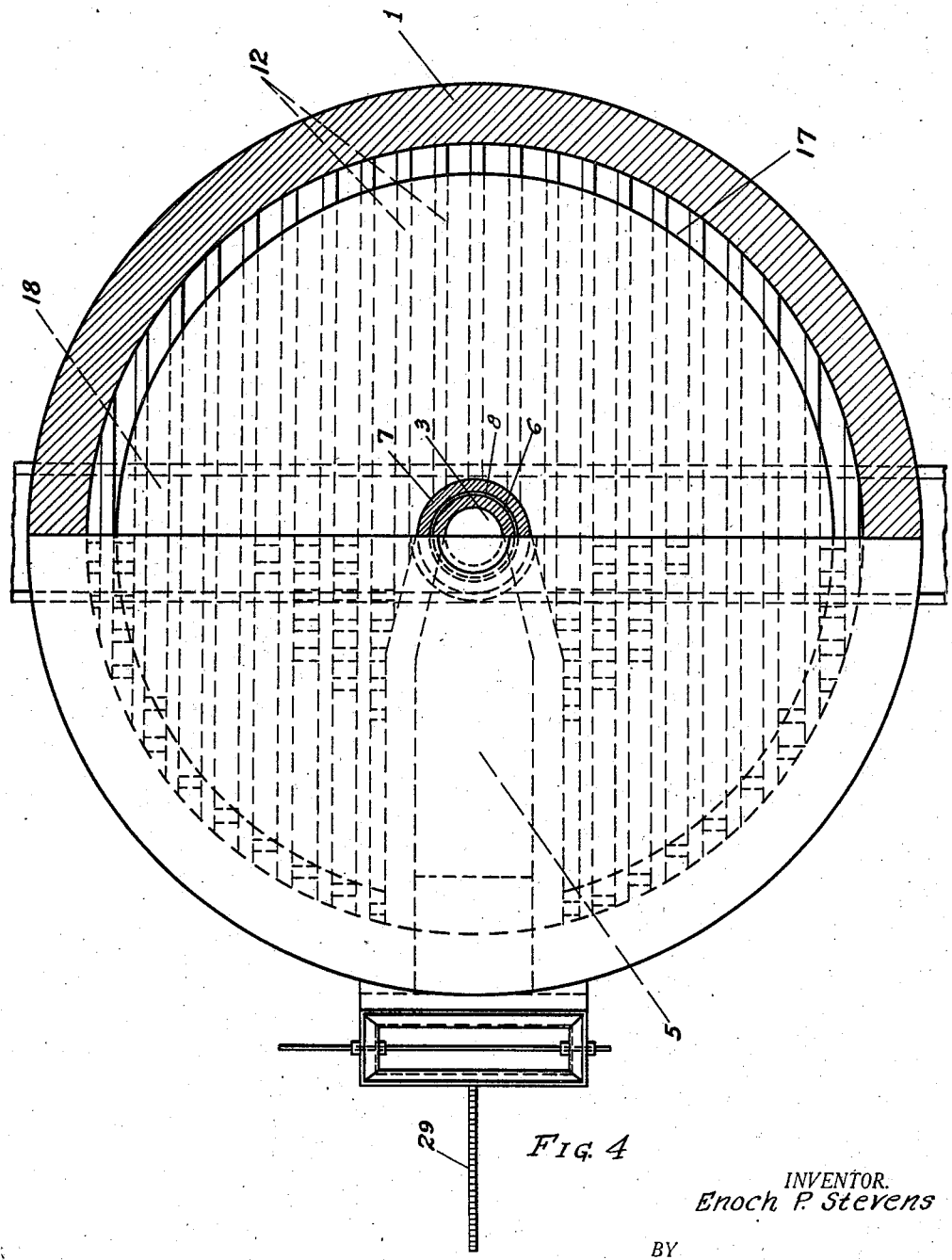
Figure 4 is a sectional view taken along the plane indicated by the line 4—4 of Figure 1.

The cylindrical wall 6 of the center flue is provided with a deflecting upper wall 15 spaced from the upper extremities of concentric walls 6 and 7. The upper wall 15 permits the mixture of air with the products of combustion from the fire box 4 and deflects same downwardly and radially toward the floor 11. The floor 11 is provided with a number of apertures 16 communicating with the various passageways provided by the walls 12—12. The baffle wall 13 is circular in contour and is spaced from the circular wall 1 as indicated by the line 17 in Figure 4. The hot gases passing through the apertures 16 in the floor 11 will pass through the passageways formed by the walls 12—12 and will be compelled to pass to the periphery of the baffle wall 13 before getting into the passageways below said baffle wall 13, which passageways are formed by the parallel walls 14. The passageways formed by the walls 14 communicate with the stack tunnel 18 through which the spent air and gases may be led from the kiln.

The fire box 4 is provided with the grate 19, which may be of any preferred construction. Said fire box 4 is fed with solid fuel from the gate 20, which may be supplied with a measured amount of fuel at regular intervals.

For the purpose of supplying a measured amount of fuel to the gate 20 at predetermined intervals, a hopper 21 may be provided, which hopper is provided with a revolving gate 22. Every revolution of the revolving gate 22 permits a measured quantity of fuel to pass from the hopper 21 to the gate 20. When said gate 20 receives a load of fuel, the weight of said fuel will cause said gate to open, allowing said fuel to drop upon the fire box 4. Said gate 20 is biased to closed position, whereby said gate will close access from the fire box to the revolving gate 22 at all times except when said gate 20 is actually performing a dumping operation.

The revolving gate 22 may be operated by the gear 23, which gear may be driven by the gear 24, which in turn is operated by the gear 25, which may be mutilated whereby to be operative upon gear 24 only during a part of a revolution of said gear 25. The gear 24 may drive the gear 26, which in turn meshes with the gear 27. Mounted upon the same shaft as the gear 27 is the gear 28 adapted to operate the rack 29. Said gear 28 should be mutilated through part of its circumference whereby to have no connection with said rack during a portion of a revolution of said gear.

Figure 1:
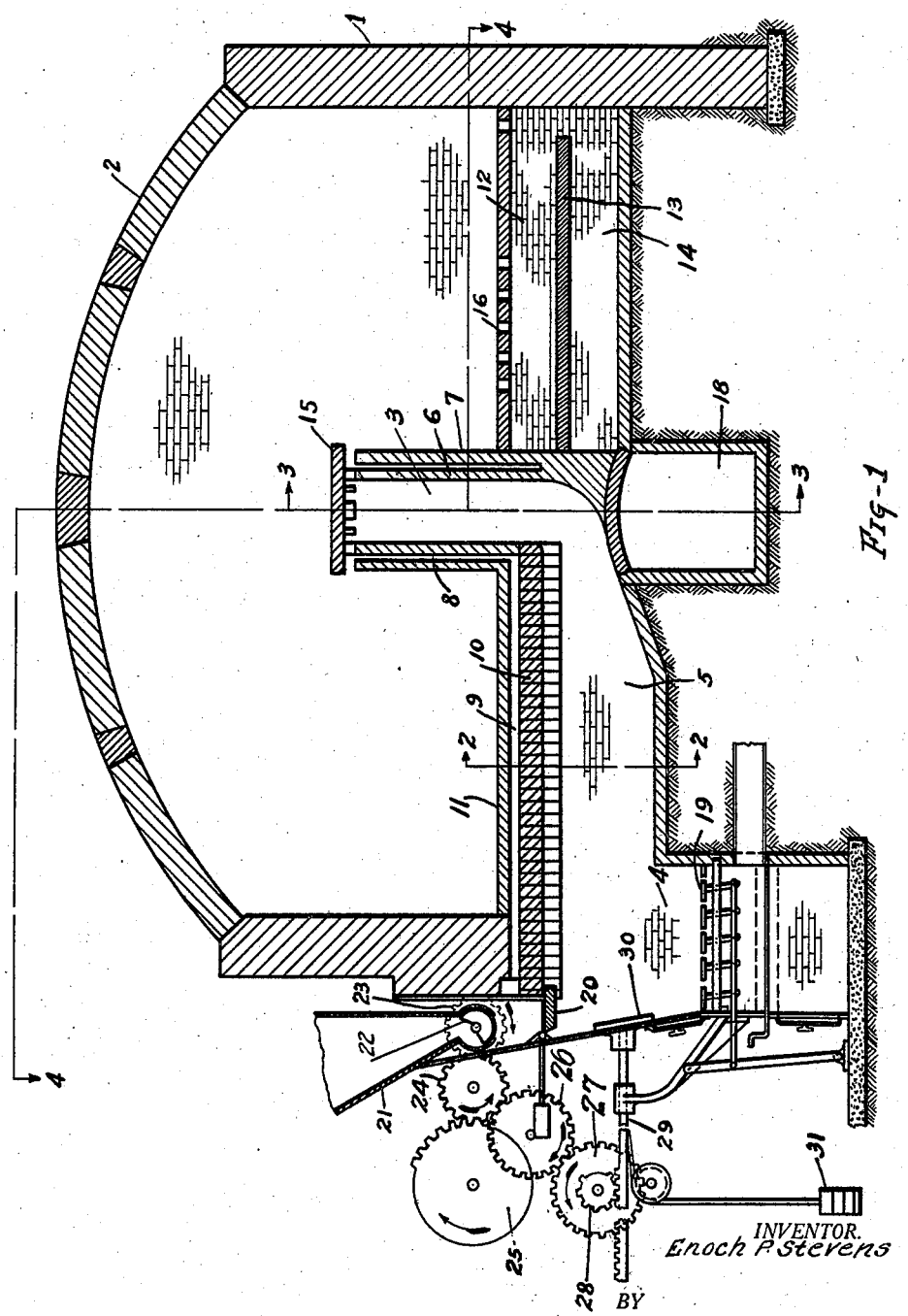
Figure 1 is a sectional view illustrating one embodiment of the present invention.

Mounted at the normal level of the fire box 4 is the spreader 30 which is operated by the rack 29. Said spreader is biased by the weight 31 to a position in close proximity to the left-hand wall of said fire box. Rotation of gear 24 will cause the rotation of the mutilated gear 28. Rotation of the mutilated gear 28 in a counter-clockwise direction, as viewed in Figure 1, will cause the spreader 30 to move in a right-hand direction as viewed in said figure whereby to spread the fuel over said fire box 4 to keep said fuel level. When the mutilated portion of gear 28 comes into proximity to the rack 29 the weight 31 will draw said spreader 30 to the left, where it will remain until the next actuating movement of the spreader is started.

The mode of operation of the above described embodiment of the present invention will be clear without detailed explanation. Brick or other material to be heat treated will be placed in the kiln and the kiln sealed shut. Products of combustion from the fire box 4 will pass through the passageway 5 to the center flue 3. Air will enter through the passageways 9 and will be heated to a high temperature by reason of contact with the wall 10 of passageway 5. The products of combustion and the heated air will be deflected by the wall 15 of the flue and will pass downwardly in and around the material to be heated passing through the apertures 16—16 of the floor 11 into the passageways formed by the parallel walls 12—12. A uniform distribution of the heated air and gases will be caused by reason of the baffle wall 13 which is mounted below the floor 11. The spent gases will be directed to the periphery of the baffle wall 13 and will enter the passageways formed by the parallel walls 14—14, which passageways lead to the stack tunnel 18.

The gear 25 may be continuously operated by means of a motor and said gear, by reason of its mutilated condition, will communicate intermittent rotary motion to the gear 24. Said gear 24, by reason of its engagement with the gear 23, will operate the revolving gate 22 intermittently to deliver measured amounts of coal to the dumping gate 20. Upon each delivery of a measured amount of coal, said gate 20 will dump and admit said coal to the fire box 4. During the intervals between dumping operations, the gate 20 will be closed. The gear 24 acting through the gears 26 and 27 will drive the mutilated gear 28 to cause intermittent operation of the rack 29 and the spreader 30. Said spreader 30 will accordingly act in timed relation to the deposits of coal and will operate to keep the coal at a level.

The invention is useful in providing a uniform heat throughout the kiln. It will be understood that if at any time it is desired to raise the temperature of the upper part of the kiln above that normally produced by the circulation of products of combustion and the heated air, such effect can be had by damping the outflow through the stack tunnel and stack. When the circulation is thus damped, the heated gases will rise to the upper part of the kiln, raising the temperature thereof materially.

One embodiment of the present invention has been described in detail. Many modifications will occur to those skilled in the art. It is intended in this patent to cover all such modifications that fall within the scope of the invention as defined by the appended claims.

I claim:

1. A kiln comprising a center flue for the admission of heated gases, a horizontal floor, means cooperating with said flue for deflecting gases downwardly toward said floor, apertures in said floor and a baffle wall placed below said floor for causing the heated gases to take a tortuous course in passing from said kiln.

2. A kiln having a center flue, a wall surrounding said flue and forming therewith an annular chamber, means providing a passageway for heated products of combustion to said flue, said last mentioned means being provided with passageways communicating with said annular chamber for conducting air to be heated by said products of combustion.

3. A kiln comprising a chamber for the reception of material to be treated, a flue for said chamber, means providing a passageway for conducting products of combustion to said chamber and providing passageways for the passage of air to said chamber, said air being caused to pass in proximity to the course of said products of combustion for preheating purposes.

4. A kiln comprising a circular wall having an apertured floor, a center flue, means for conducting heated gases to said flue, said means providing passageways for conducting air in a position to be preheated by said heated gases, said kiln being provided with a baffle wall below said floor for directing gases toward the periphery of said kiln.

5. A kiln having an apertured floor and a horizontal baffle wall placed below said floor for causing heated gases to take a course toward the outer wall of said kiln.

6. A kiln having a source of heated gases, a vertical flue in the interior of said kiln, a conduit for conducting heated gases to said flue, said conduit having passageways associated therewith for conducting air to be heated by the heated gases in said conduit.

7. A kiln having a flue in the interior thereof, a conduit for conducting heated gases to said flue, said conduit having means associated therewith for conducting air to the interior of said kiln along paths in proximity to said heated gases.

8. A kiln having a flue in the interior thereof, a conduit for conducting heated gases to said flue, said conduit having means associated therewith for conducting air to the interior of said kiln along paths in proximity to said heated gases, said kiln being provided with means for directing said air and heated gases to a common point.

Signed at New York, New York, this 20th day of May, 1922.

ENOCH P. STEVENS.